United States Patent [19]

Maresca et al.

[11] Patent Number: 4,788,249

[45] Date of Patent: Nov. 29, 1988

[54] THERMOPLASTIC RESINS AND POLYAMIDES COMPATIBILIZED WITH POLYAMIDE-POLYESTER BLOCK COPOLYMERS

[75] Inventors: Louis M. Maresca; Sheldon J. Shafer, both of Pittsfield, Mass.

[73] Assignee: General Electric Company, Pittsfield, Mass.

[21] Appl. No.: 117,244

[22] Filed: Nov. 4, 1987

[51] Int. Cl.$^4$ .............................................. C08L 77/00
[52] U.S. Cl. ........................................ 525/66; 525/67; 525/425; 525/432; 525/433
[58] Field of Search ............... 525/66, 67, 92, 146, 525/166, 179, 425, 433, 426, 432, 902

[56] References Cited

FOREIGN PATENT DOCUMENTS 0227053  7/1987  European Pat. Off. .
1069862  4/1986  Japan .

*Primary Examiner*—Theodore E. Pertilla
*Attorney, Agent, or Firm*—Hedman, Gibson, Costigan & Hoare

[57] ABSTRACT

Thermoplastic compositions of a polyamide with a thermoplastic polyester, polycarbonate, poly(ester carbonate) or polyarylate resin compatibilized with a polyamide-polyester block copolymer have excellent physical properties after molding and show no evidence of delamination.

22 Claims, No Drawings

THERMOPLASTIC RESINS AND POLYAMIDES COMPATIBILIZED WITH POLYAMIDE-POLYESTER BLOCK COPOLYMERS

CROSS-REFERENCE TO RELATED APPLICATION

This application is related to the following commonly-assigned patent application

| SERIAL NO. | FILED | FOR | APPLICANTS | STATUS |
|---|---|---|---|---|
| 812,433 | 12/23/85 | THERMOPLASTIC BLENDS WITH AMORPHOUS POLYMERS | L. M. Maresca D. C. Clagett U. S. Wascher | Pending |
| 117,246 | | BLENDS OF THERMOPLASTIC POLYESTER RESINS AND AMORPHOUS POLYAMIDES | D. C. Clagett D. W. Fox L. M. Maresca S. J. Shafer | |
| 117,245 | | AMIDE-ESTER COPOLYMERS AND PROCESS | D. C. Clagett D. W. Fox L. M. Maresca S. J. Shafer | |

FIELD OF THE INVENTION

The present invention relates to compatibilized thermoplastic resin blends containing a polyamide resin and a resin comprising a polyester, a polycarbonate, a poly(ester carbonate), a polyarylate, or a mixture of any of them. More particularly, the present invention relates to thermoplastic resin blends containing a polyamide resin and a thermoplastic resin of the foregoing type compatibalized with a block copolymer of a polyester and a polyamide, optionally containing rubbery impact modifier.

BACKGROUND OF THE INVENTION

Thermoplastic polyester resins are well known materials which, due to their many advantageous physical properties, find use as engineering resins in many commercial and industrial applications. Such resins, for example, exhibit excellent properties of toughness, flexibility, impact strength, chemical resistance, and heat resistance. Typical polyester resins are prepared from a dihydric alcohol or a polyglycol ether and a dicarboxylic acid or chemical equivalent thereof. Closely related polycarbonate resins are prepared from a dihydric phenol and phosgene or a phosgene precursor, and, if an aromatic dicarboxylic acid is also included, the resin obtained will be a poly(ester carbonate). If a wholly aromatic dihydric phenol and a wholly aromatic dicarboxylic acid or derivative are reacted, the product will be a special type of polyester known as a polyarylate resin.

These resins have been commonly blended with other resins to produce blends having various modified properties. For example, blends of these resins with second and even third thermoplastic resin can lead to blends which not only have the above mentioned properties but additionally have excellent properties for which such thermoplastic resins may not ordinarily be recognized, such as chemical resistance, hydrolytic stability, resistance to brittle failure and gas barrier properties.

For some important applications, e.g. automotive parts, it is important that such resins have enhanced chemical resistance to aggressive solvents, for example, acetone, aromatic solvents, gasoline, and the like, to a degree which may not be necessary in most other applications. In the inventions of Ser. Nos. 812,433 and 117,246 the necessary levels of solvent resistance in combination with excellent levels of other necessary properties, are achieved by use of certain blends of polycarbonate, poly(ester carbonate), polyarylate or polyester with polyamides. Although such blends exhibit many desirable properties of such resins including excellent chemical resistance, ductility, and resistance to brittle failure, and high gas barrier properties, they have one drawback, however, and that appears to be a certain lack of compatibility, as evidenced by delamination of articles molded from such blends.

In the above mentioned application Ser. No., 117,245, block copolymers comprising polyamide segments and polyester segments are disclosed to be useful per se as molding resins and as blending resins with other thermoplastics.

Such polyamide-polyester block copolymers now, surprisingly, have been found to significantly improve the compatibility of blends of polyamides with polyesters, polycarbonates, poly(ester carbonates) and polyarylates. Molded articles containing an effective amount of the polyamide-polyester block copolymer including those having an effective content of a rubbery impact modifier have much less tendency to delaminate and they exhibit high notched Izod impact values, especially in modified versions.

The present invention, therefore, provides blends containing polyamides and thermoplastic resins which otherwise exhibit the desirable properties of such resins, without evidence of incompatibility.

SUMMARY OF THE INVENTION

Briefly, according to the present invention, there are provided polyamide blends with other resins, compatibilized with polyamide-polyester block copolymers. Such blends comprise:
(i) at least one high molecular weight thermoplastic resin selected from a polyester, a polycarbonate, a poly(ester carbonate), a polyarylate or a mixture of any of the foregoing;
(ii) a polyamide resin; and
(iii) an effective, compatibilizing amount of a polyamide-polyester block copolymer.

Also contemplated are such blends which also include
(iv) an effective impact improving amount of a rubbery impact modifier.

DETAILED DESCRIPTION OF THE INVENTION

With respect to polyester component (i), these are derived from an aliphatic, aliphatic ether or cycloaliphatic diol, or mixtures thereof, containing from 2 to about 16 carbon atoms and at least one dicarboxylic acid, such as an aliphatic acid, e.g., adipic acid, sebacic acid, a cycloaliphatic acid, such as cyclohexenedicarboxylic acid or an aromatic dicarboxylic acid. Preferred polyesters are derived from an aliphatic diol and an aromatic dicarboxylic acid and have repeating units of the following general formula:

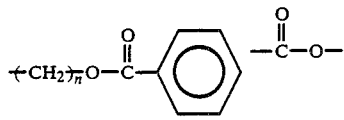

wherein n is an integer of from 2 to 6. The most preferred polyesters are poly(ethylene terephthalate) and poly(1,4-butylene terephthalate).

Also contemplated herein are the above polyesters with minor amounts, e.g., from 0.5 to about 2 percent by weight, of units derived from aliphatic polyols, to form copolyesters. The aliphatic polyols include glycols, such as poly(ethylene glycol).

The polyesters that are derived from a cycloaliphatic diol and an aliphatic aromatic and/or cycloaliphatic dicarboxylic acid are prepared, for example, from reaction of either the cis- or trans-isomer (or mixtures thereof), of 1,4-cyclohexanedimethanol, with a dicarboxylic acid so as to produce a polyester having recurring units of the following formula:

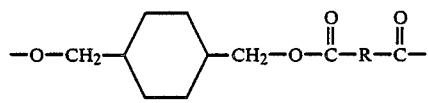

wherein the cyclohexane ring is selected from the cis- and trans-isomers thereof and R represents an alkyl of from 2 to 10 carbon atoms, alkylaryl, aryl, arylalkyl, or cycloaliphatic radical containing 6 to 20 carbon atoms and which is the decarboxylated residue derived from an aromatic dicarboxylic acid or obvious equivalent, e.g., a diester, a diacid chloride, etc.

Examples of dicarboxylic acids represented by the carboxylated residue R are isophthalic or terephthalic acid, 1,2-di(p-carboxyphenyl)ethane, 4,4'-dicarboxydiphenyl ether, etc., and mixtures of these. Preferably the acids contain at least one aromatic nucleus. Acids containing fused rings can also be present, such as in 1,4- or 1,5-naphthalene dicarboxylic acids. Also contemplated are aliphatic and cycloaliphatic diacids, such as adipic acid, sebacic acid and cyclohexane dicarboxylic acid. The preferred dicarboxylic acids are terephthalic acid or a mixture of terephthalic and isophthalic acids.

Another preferred polyester block may be derived from the reaction of either the cis- or trans-isomer (or a mixture thereof) of 1,4-cyclohexanedimethanol with a mixture of isophthalic and terephthalic acids. Such a polyester would have repeating units of the formula:

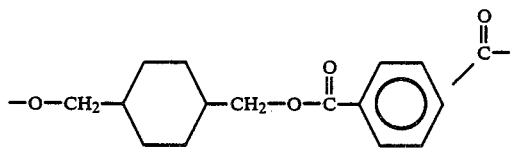

Still another preferred polyester is a copolyester derived from a cyclohexanedimethanol, an alkylene glycol and an aromatic dicarboxylic acid. These copolyesters are prepared by condensing either the cis or trans-isomer, or mixtures thereoef, of, for example, 1,4-cyclohexanedimethanol and an alkylene glycol with an aromatic dicarboxylic acid so as to produce a copolyester having units of the following formulae:

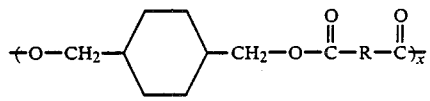

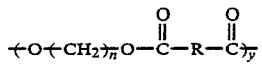

wherein the cyclohexane ring is selected from the cis- and trans-isomers thereof, R is as previously defined, n is an integer of 2 to 6, the x units comprise from about 10 to 90 percent by weight, and the y units comprise from about 90 to about 10 percent by weight. Preferably R is para-phenylene and the preferred compositions are

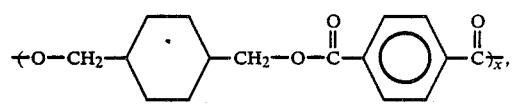

and

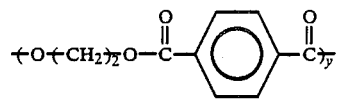

wherein x and y are as previously defined.

Also included within this invention are polyesters derived from aliphatic ether diols, for example, tetramethyleneoxydiol, and the same diesters of diacids.

The polyesters described herein are either commercially available or can be produced by methods well known in the art, such as those set forth in, for example, U.S. Pat. Nos. 2,901,466 and 3,651,014.

The polyesters used herein have an intrinsic viscosity of from about 0.4 to about 2.0 dl/g. as measured in a 60:40 phenol/tetrachloroethane mixture of similar solvent at 23°-30° C.

Polycarbonate resins suitable for use as component (i) herein can be prepared by reacting a dihydric phenol with a carbonate precursor, such as phosgene, a haloformate or a carbonate ester. Generally speaking, such carbonate polymers may be typified as possessing recurring structural units of the formula:

wherein D is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. The preferred polycarbonate resin for use herein is a homopolymer derived from 2,2-bis(4-hydroxyphenyl)propane and a carbonate precursor.

These aromatic polycarbonates can be manufactured by known processes, such as, for example and as mentioned above, by reacting a dihydric phenol with a carbonate precursor, such as phosgene, in accordance with methods set forth in U.S. Pat. Nos. 4,018,750 and 4,123,436; or by transesterification processes such as are disclosed in U.S. Pat. No. 3,154,008, as well as other processes known to those skilled in the art.

Poly(ester carbonate) resins suitable for use as component (i) herein may generally be described as polymers comprising recurring carbonate groups,

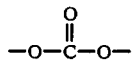

carboxylate groups,

and aromatic carbocyclic groups in the linear polymer chain, in which at least some of the carboxylate groups and at least some of the carbonate groups are bonded directly to ring carbon atoms of the aromatic carbocyclic groups. These poly(ester carbonate) polymers, in general, are prepared by reacting an aromatic dicarboxylic acid or ester forming derivative, a dihydric phenol and a carbonate precursor.

The preparation of poly(ester carbonates) which may be employed in the compositions of the present invention is described in U.S. Pat. Nos. 3,030,331; 3,169,121; 3,207,814; 4,194,038 and 4,156,069 incorporated herein by reference.

The poly(ester carbonates) which are preferred in the practice of the present invention include the aromatic poly(ester carbonates) derived from dihydric phenols, aromatic dicarboxylic acids or their reactive ester forming derivates such as the aromatic diacid halides, and phosgene. A particularly useful class of aromatic poly(ester carbonates) is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the poly(ester carbonate) is generally from about 25 to 90 mole percent and preferably about 35 to 80 mole percent. The molar range of terephthalate units, the remainder of the copolymer ester units preferably comprising isophthalate units is generally from about 2 to 90 percent, and preferably from about 5 to about 25 percent.

Polyarylate resins suitable for use as component (i) herein are aromatic polyesters containing carboxylate groups,

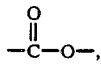

and aromatic carbocyclic groups in the linear polymer chain, in which at least some of the carboxylate groups join directly ring carbon atoms of the aromatic carbocyclic groups. The polyarylate polymers, in general, are prepared by reacting a aromatic dicarboxylic acid or ester forming derivative thereof, and a dihydric phenol. Of course, polyarylates may be polymerized from a carboxylic acid/hydroxy functional monomer in a head-tail arrangement.

A preferred polyarylate contains a dihydric phenol and an aromatic dicarboxylic acid. The aromatic dicarboxylic acid portion contains from about 95 to 0 mole percent of terephthalic acid and from about 5 to about 100 mole percent of isophthalic acid. More preferably, such polyarylates contain a mixture of from about 30 to about 70 mole percent terephthalic acid and from about 70 to about 30 mole percent of isophthalic acid. A polyarylate containing a mixture of 50 mole percent of terephthalic acid and 50 mole percent isophthalic acid is common. In general, these and other suitable polyarylates have a reduced viscosity of from about 0.4 to about 1.0 as measured in p-chlorophenol at 40° C. (0.2 g/100 ml).

The polyarylates used in the present invention can be prepared by any of the well known prior art polyester forming reactions, such as the reaction of the acid chlorides of the aromatic dicarboxylic acids with the dihydric phenol, the reaction of the diaryl esters of the aromatic dicarboxylic acids with the dihydric phenols, and the reaction of the aromatic dicarboxylic acids with diester derivates of dihydric phenol. These processes are described in, for example, U.S. Pat. Nos. 3,317,464; 3,948,856; 3,780,148; 3,824,213 and 3,133,898.

Typical dihydric phenols useful in formulating the polycarbonate, poly(ester carbonate), or polyarylate resins as described above may be represented by the general formula:

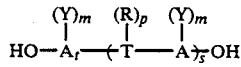

in which A is an aromatic group such as phenylene, biphenylene, naphthlene, anthrylene, etc. T may be an alkylene or alkylidene group such as methylene, ethylene, propylene, propylidene, isopropylidene, butylene, butylidene, isobutylidene, amylene, isoamylene, amylidene, isoamylidene, and generally from 1 to 12 carbon atoms, inclusive, etc. Where T is an alkylene or alkylidene group, it may also consist of two or more alkylene or alkylidene groups, connected by a non-alkylene or non-alkylidene group, such as an aromatic linkage, a tertiary amino linkage, an ether linkage, a carbonyl linkage, a silicon-containing linkage, or by a sulfur-containing linkage such a sulfide, sulfoxide, sulfone, etc. In addition, T may be a cycloaliphatic group of 5 to 7 carbon atoms, inclusive, e.g. cyclopentyl, cyclohexyl, or a cycloalkylidene of five to seven carbon atoms, inclusive, such as cyclohexylidene; a sulfur-containing linkage, such as sulfide, sulfoxide or sulfone; an ether linkage; a carbonyl group; a direct bond; a tertiary nitrogen group; or a silicon-containing linkage such as silane or siloxy. Other groups with T may represent will occur to those skilled in the art. R is hydrogen or a monovalent hydrocarbon group such as alkyl of 1 to 8 carbon atoms, inclusive, e.g., methyl, ethyl, propyl, etc.; aryl of 6 to 20 carbon atoms inclusive, e.g., phenyl, naphthyl, etc.; arylalkyl, of from 7 to 20 carbon atoms, inclusive, e.g., benzyl, ethylphenyl, etc.; or cycloaliphatic of 5 to 7 carbon atoms, inclusive, e.g., cyclopentyl, cyclohexyl, etc. Y may be an inorganic atom such as chlorine, bromine, fluorine, etc.; a group such as the nitro group, etc.; an organic group such as R above; or an oxy group such as OR, it being only necessary that Y be inert to and unaffected by the reactants and the reaction conditions. The letter m is any whole number from and including zero through the number of positions on A available for substitution; p is any whole number from and including zero through the number of available positions on T; t is a whole number equal to at least one; and s is any whole number from and including zero to twenty.

In the typical dihydric phenol compound represented by the formula above, when more than one Y substituent is present, they may be the same or different. The same is true for the R substituent. Where s is greater than one, T can be the same or different. Where T is a direct bond, the aromatic rings are directly joined with no intervening alkylene or other bridge. The positions of the hydroxyl groups and Y on the aromatic nuclear residues, A, can be varied in the ortho, meta, or para positions; and the groupings can be in a vicinal, nonsymmetrical or symmetrical relationship, where two or more ring carbon atoms of the aromatic hydrocarbon residue are substituted with Y and a hydroxyl group.

Examples of dihydric phenol compounds that may be employed in the above polymers include:
2,2-bis-(4-hydroxyphenyl)propane, (bisphenol-A);
2,4'-dihydroxydiphenylmethane;
bis-(2-hydroxyphenyl)methane:
bis-(4-hydroxyphenyl)methane:
bis-(4-hydroxy-5-nitrophenyl)methane:
bis-(4-hydroxy-2,6-dimethyl-3-methoxyphenyl)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxynaphthyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexylmethane;
1,2-bis-(4-hydroxyphenyl)-1,2-bis-(phenyl)propane;
2,2-bis-(4-hydroxyphenyl)-1-phenylpropane;
and the like. Also included are dihydroxybenzenes typified by hydroquinone and resorcinol; dihydroxydiphenyls such as 4,4'-dihydroxydiphenyl; 2,2'dihydroxydiphenyl; 2,4'-dihydroxydiphenyl; dihydroxy-naphthalenes such as 2,6-dihydroxynaphthalene, etc.

Also useful are dihydric phenols wherein T is a sulfur-containing radical such as the dihydroxy aryl sulfones exemplified by: bis-(4-hydroxyphenyl)sulfone; 2,4'-dihydroxydiphenyl sulfone; bis(3,5dimethyl-4-hydroxyphenyl)sulfone; 5'-chloro-2,4'dihydroxydiphenyl sulfone; 3-chloro-bis-(4-hydroxyphenyl)sulfone; and 4,4'dihydroxytriphenyldisulfone; etc. The preparation of these and other useful sulfones are described in U.S. Pat. No. 2,288,282. Hydroxy terminated polysulfones as well as substituted sulfones using halogen, nitrogen, alkyl radicals, etc., are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:
4,4'-dihydroxydiphenyl ether;
4,4'-dihydroxytriphenyl ether;
the 4,3'-, 4,2'-, 4,1'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
3,3'-dihydroxy-3,3'-difluorodiphenyl ether;
4,4'-dihydroxy-2,3'-dibromodiphenyl ether;
6,6'-dihydroxydinaphthyl-2,2'-ether;
6,6'-dihydroxy-5,5'-dichlorodinaphthyl-2,2'-ether; 4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed, and where dihydric phenol is mentioned herein mixtures of such materials are considered to be included. Other dihydric phenols which are suitable for the preparation of the above described polymers are disclosed in U.S. Pat. Nos. 2,999,835; 3,028,365; 3,334,154; 4,131,575.

In general, any aromatic dicarboxylic acid or its reactive derivative, such as an acid halide, conventionally used in the preparation of polyesters, may be used for the preparation of the poly(ester carbonates) or polyarylates described above. The aromatic dicarboxylic acids which may be used include the aliphatic-aromatic dicarboxylic acids, in addition to the wholly aromatic dicarboxylic acids. Of course, skilled practitioners will recognize that some small percentage by number of the dicarboxylic acid may be aliphatic dicarboxylic acid. However, the use of such aliphatic dicarboxylic acid should not be to such a degree that desirable characteristics associated with aromatic carboxylic acids are substantially reduced. The aromatic dicarboxylic acids or their reactive derivatives, such as the aromatic diacid halides, produce poly(ester carbonate) and polyarylate resins which are most useful from the standpoint of physical properties.

The aromatic dicarboxylic acids may be represented by the general formula:

HOOC—R¹—COOH wherein $R^1$ represents an aromatic radical such a phenylene, naphthylene, biphenylene, substituted phenylene, etc.; two or more aromatic groups connected through non-aromatic linkages such as those defined by T above; or a divalent aliphatic-aromatic hydrocarbon radical such as an arylalkyl or alkylaryl radical. For purposes of the present invention, the aromatic dicarboxylic acids or their reactive derivatives such as, for example, the acid halides or diphenyl esters, are preferred. Thus, in the preferred aromatic dicarboxylic acids, as represented above, $R^1$ is an aromatic radical such as phenylene, biphenylene, naphthylene, substituted phenylene, etc. Some non-limiting examples of suitable aromatic dicarboxylic acids which amy be used in preparing the poly(ester carbonate) or polyarylate resins of the instant invention include phthalic acid, isophthalic acid, terephthalic acid, homophthalic acid, o-, m-, and p-phenylenediacetic acid, and the polynuclear aromatic diacids such as diphenyl dicarboxylic acid, and isomeric naphthalene dicarboxylic acids. The aromatics may be substituted with Y groups in the same manner as the dihydric phenolic aromatics are substituted. Of course, these acids may be used individually or as mixtures of two or more different acids.

The carbonate precursor used above to produce the polycarbonate or poly(ester carbonate) resins may be either a carbonyl halide, a carbonate ester, or a haloformate. The carbonyl halides which can be employed herein are carbonyl chlorides and carbonyl bromides. Typical of the carbonate esters are diphenyl carbonate, di(halophenyl)carbonates such as di(chlorophenyl)carbonate, di(bromophenyl)carbonate, di(trichlorophenyl)carbonate, di(tribromophenyl)carbonate, etc., di(alkylphenyl)carbonates such as di(tolyl)carbonate, di(naphthyl)carbonate, di(chloronaphthyl)carbonate, phenyltolyl carbonate, chloronaphthyl chlorophenyl carbonate, and the like. The haloformates suitable for use herein include bishaloformates of dihydric phenols such as bischloroformates of hydroquinone, etc., or glycols such as bis-haloformates of ethylene glycol, neopentyl glycol, polyethylene glycol, etc. While other carbonate precursors will occur to those skilled in the art, carbonyl chloride, also known as phosgene, is preferred.

The polyamides utilized as component (ii) in this invention can be crystalline, amorphous or semicrystalline.

Examples of polyamides contemplated to be useful in this invention include, but are not limited to, those having repeating units of a formula selected from the group

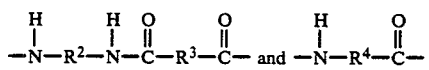

wherein $R^2$, $R^3$ and $R^4$ are the same or different divalent organic radicals selected from the group consisting of $C_2$-$C_{15}$ alkylene radicals, $C_3$-$C_{18}$ cycloalkylene radicals and $C_6$-$C_{20}$ arylene radicals. Mixed alkylene-cycloalkylene radicals or alkylene-arylene or arylene-alkylene radicals of $C_4$-$C_{30}$ are also considered to be within the scope of the terms "cycloalkylene" and "arylene", respectively.

These polyamides may be prepared by polymerization of a diamine having the formula

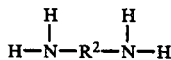

with a dicarbonyl compound such as dicarboxylic acids, esters or chlorides of the formula

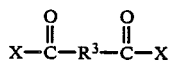

wherein X is chlorine, hydroxy, $C_1$-$C_6$ alkoxy of $C_6$-$C_{20}$ aryloxy and $R^2$ and $R^3$ are as defined above. Typically, equimolar portions of the diamine and dicarboxylic acid are utilized. Slight departures from the equimolar proportions can be tolerated. Examples of suitable diamines include ethylenediamine, trimethylenediamine, tetramethylenediamine, pentamethylenediamine, hexamethylenediamine, octamethylenediamine, isomeric trimethylhexamethylenediamine, 2,2-bis(p-amino-3-methylcyclohexyl)methane, bis(4-aminophenyl)methane, meta-phenylenediamine, para-phenylenediamine, meta-xylylenediamine, para-xylylenediamine and the like.

Suitable dicarboxylic acids/esters include sebacic acid, suberic acid, glutaric acid, pimelic acid, adipic acid, terephthalic acid, isophthalic acid, and azelaic acid.

An alternative method for preparing the polyamides utilized in this invention is to polymerize monoamino-monocarbonyl compound of the formula:

wherein X and $R^4$ are as defined above. Lactam structures for these monoamine-monocarboxylic acid may also be utilized. The lactam structures are ring structures formed by self-reaction of the amine and acid groups. Examples of these monoamino-monocarboxylic acids and acids and their lactams include; aminocaproic acid, butyrolactam, pivalolactam, caparolactam, capryllactam, enantholactam, undecanolactam, dodecanolactam, 3-aminobenzoic acid and 4-aminobenzoic acid. Mixtures of the lactams with diamines and dicarboxylic acids, and their derivatives will also produce polyamides suitable for this invention. Mixtures, random copolymers or block copolymers of two or more of the polyamides are within the scope of this invention also, as well as blends of crystalline and amorphous polyamides.

Preferred polyamides include nylons 6, 6/6, 11, 12, 6/3, 4/6, 6/4, 6/9, 6/10, 6/12. Also preferred combinations of diacid and diamine include terephthalic acid with trimethylhexamethylenediamine; isophthalic acid with trimethylhexamethylenediamine; adipic acid plus azelaic acid with 2,2-bis-(p-aminocyclohexyl)propane; terephthalic acid with bis(4-aminocyclohexyl)methane; isophthalic acid with hexamethylenediamine and terephthalic acid and isophthalic acid with hexamethylenediamine and combinations thereof.

PACP-9/6, which is a 50:50 mole ratio copolymer of 2,2'-bis(4-aminocyclohexyl)propane and a 60/40 weight percent mixture of azelaic acid and adipic acid. A more detailed description of the preparation of this polymer is found in U.S. Pat. No. 3,840,501 which is incorporated herein by reference.

Zytel ®330 and Selar PA, which are polyamides derived from hexamethylenediamine and mixtures of terephthalic acid and isothalaic acid. These amorphous polyamides are avialable from E. I. duPont.

Gilamid ®TR 55, which is a polyamide derived from isophthalic acid/bis(4-amino-3-methylcyclohexyl)methane/lauryl lactam and is available from Emser Industries.

Trogamid ® T, which is derived from dimethyl terephthalate and a mixture of 2,2,4- and 2,4,4-trimethylhexamethylenediamine and is available from Dynamit Nobel.

It is also to be understood that the use of the term "polyamides" herein and in the appended claims is intended to include the toughened or super tough polyamides. Super tough polyamides, or super tough nylons, as they are more commonly known, are available commercially, e.g., from E.I. DuPont under the tradename Zytel ® ST, or may be prepared in accordance with a number of patents including, among others, Epstein, U.S. Pat. No. 4,174,358; Novak, U.S. Pat. No. 4,474,927; Roura, U.S. Pat. No. 4,346,296; and Joffrion, U.S. Pat. No. 4,251,644. These super tough nylons are prepared by blending one or more polyamides with one or more polymeric or copolymeric elastomeric toughening agents. Suitable toughening agents are disclosed in the above-identified U.S. Patents as well as in Caywood, Jr., U.S. Pat. No. 3,884,882, and Swiger, U.S. Pat. No. 4,147,740 and Gallucci et al., "Preparation and Reactions of Epoxy-Modified Polyethylene", J. APPL. POLY. SCI., V. 27, pp. 425-437 (1982). Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

Crystalline polyamides for use herein are, invariably, highly crystalline with well-defined x-ray patterns. Amorphous polyamides for use herein are generally transparent with no distinct melting point, and the heat of fusion is about 1 cal/gram or less. The heat of fusion may be conveniently determined by use of a differential scanning calorimeter (DSC).

The block copolymers of polyamides and polyesters are of the general formula

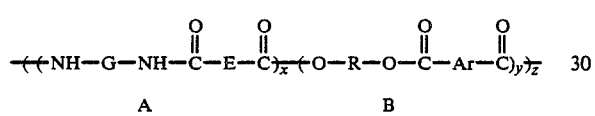

wherein repeating units A comprise an amorphous or crystalline polyamide constituting from about 1 to about 99 percent by weight of said block copolymer and repeating units B comprise a polyester constituting from about 99 to about 1 percent by weight of said block copolymer, where E is selected from divalent alkyl, aryl, cycloalkyl, arylalkyl and alkylaryl groups of from 1 to 30 carbon atoms or a mixture of any of the foregoing, optionally substituted with at least one chlorine, bromine, fluorine, nitro, nitrile, alkyl of from 1 to 6 carbon atoms, alkoxy of from 1 to 6 carbon atoms or aryl of from 6 to 20 carbon atoms; G is a divalent alkyl, aryl, cycloalkyl, arylalkyl or alkylaryl group of from about 2 to about 30 carbon atoms or a mixture of any of the foregoing, optionally interrupted with alkylene, arylene, carbonyl, ether, amino or sulfur-containing groups, optionally substituted with at least one of chlorine, bromine, fluorine, nitro, nitrile, alkyl of from 1 to 6 carbon atoms, alkoxy of from 1 to 6 carbon atoms or aryl of from 6 to 20 carbon atoms; R is a divalent alkyl, cycloalkyl or aliphatic ether group of from about 1 to about 10 carbon atoms or a mixture of any of such groups; and Ar is a divalent aromatic carbocyclic group, optionally substituted with at least one of chlorine, bromine, fluorine, nitro, nitrile, alkyl of from 1 to 6 carbon atoms, alkoxy of from 1 to 6 carbon atoms, aryl of from 6 to 20 carbon atoms or a mixture of any such groups, and x, y and z are each integers of from 1 to 100,000. Preferably the block copolymers will have x and y greater than 20.

The block copolymers, above defined, can be made by a two step process comprising
(1) heating a mixture of of at least one diaryl ester of a dicarboxylic acid of the formula

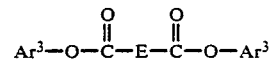

wherein the groups $Ar^3$ represent the same or different aromatic moiety of 6-20 carbon atoms, optionally substituted with at least one of chlorine, bromine, fluorine, nitro, nitrile, alkyl of from 1 to 6 carbon atoms alkoxy of from 1 to 6 carbon atoms of aryl of from 6 to 20 carbon atoms and E is as defined above with an amine of the formula $$R^2NH—G—NHR^2$$

wherein G is as defined in above and $R^2$ is hydrogen or alkyl of from 1 to 10 carbon atoms and, in addition, when taken together the same as G, and
(2) adding to the product of step (1) a dihydric alcohol of the formula $$HO—R—OH$$

wherein R is as defined in above and at least one diester of an aromatic dicarboxylic acid of the formula

wherein $R^3$ is alkyl of from 1 to 12 carbon atoms or a group as defined for $R^3$ above, and Ar is as defined above, continuing the heating at a temperature above which a homogeneous melt is obtained under reduced pressure to remove byproducts until formation of said polyamide polyester block copolymer is substantially complete.

Preferably, the diaryl ester used in step (1) comprises a diaryl terephthalate, a diaryl isophthalate, a diaryl adipate or a mixture thereof. Especially preferably, the diaryl ester will comprise diphenyl isophthalate diphenyl terephthalate or diphenyl adipate. Preferably also, the diamine used in step (1) comprises ethylenediamine, trimethylenediamine, tetramethylenediamine, pentamethylenediamine, 2-methylpentamethylenediame, hexamethylenediamine, isomeric trimethylhexamethylenediamine, meta-xylylenediamine, para-xylylenediamine, 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, 1,4-piperazine, metaphenylenediamine, paraphenylenediamine, bis(4-aminophenyl)methane and the like or mixtures thereof. Preferably in step (2) the diester will comprise a dialkyl or diaryl terephthalate, a dialkyl or diaryl isophthalate or a mixture thereof. Special mention is made of a process wherein the diol comprises ethylene glycol, 1,4-butanediol, polybutylene glycol, 1,4-cyclohexanediamethanol, or a mixture of any of the foregoing. Ethylene glycol, 1,4-butanediol are preferred.

Blends of polyamide with polyester, polycarbonate, poly(ester carbonate) or polyarylate, in any proportion, will at least in some degree exhibit characteristics embodying the present invention. However, as a practical matter, the benefits of such blend will not be measurably significant outside a weight ratio of from about 2/98 to about 98/2 polyamide to total polyester, polycarbonate, poly(ester carbonate) and/or polyarylate content. Preferably, this ratio is between about 10/90 to about 90/10. An effective amount of block copolymer will generally comprise from about 10 to about 50 parts by weight per hundred parts by weight of (i) and (ii) combined.

Of course, the blends herein may contain other thermoplastic resins, various impact modifiers, stabilizers, flame retardants, mold release agents, reinforcing agents, pigments, and the like. Examples of the other thermoplastic resins include poly(ether imides), polysulfones, polyphenylene oxides, and the like. Generally, such other thermoplastic resins should not constitute greater than 80% by weight of total thermoplastic content. Many additives are widely used and recognized as suitable for use herein.

Preferred embodiments of this invention include (iv) rubbery impact modifiers. A wide variety of impact modifiers are known to be useful for thermoplastic resin compositions, such as copolymers and interpolymers of rubbery diene and acrylate polymers, rubber ethylene-propylene-diene terpolymers, styren-ethylene-butylene-styrene block copolymers, methyl methacrylate-styrene-butadiene terpolymers, and the like.

Preferred impact modifiers contemplated for use in this invention are those known as core-shell graft copolymers which have a rubbery first stage, or core, and a hard, thermoplastic stage, or shell, grafted thereon. The rubber core may comprise (1) polymerized conjugated diene units of one or more conjugated dienes alone or (2) copolymerized conjugated dienes with units of a vinyl monomer or mixture of vinyl monomers or (3) polymerized acrylate monomers ($C_1$–$C_8$) alone or (4) copolymerized acrylate monomers ($C_1$–$C_8$) with other vinyl monomers.

Suitable conjugated dienes for use in said core phase include butadiene, isoprene, 1,3-pentadiene and the like. Illustrative of the vinyl monomers copolymerizable with the conugated dienes include vinyl aromatic compounds such as styrene, alpha-methylstyrene, vinyl toluene, para-methylstyrene and the like; esters of acrylic and methacrylic acid, including for example methyl acrylate, ethyl acrylate, n-butyl arylate, iso-butyl acrylate, methyl methacrylate and ethyl methacrylate; and unsaturated aliphatic nitriles such as acrylonitrile, methacrylonitrile and the like. Suitable acrylate monomers of 1–8 carbon atoms are the esters of acrylic acid and methacrylic acid given above. The acrylate monomers may be copolymerized with the vinyl aromatic compounds and unsaturated aliphatic nitriles also. The rubber core may also include a cross-linking monomer and/or a graft linking monomer, more particularly described below.

One preferred class of core-shell graft copolymers for use herein comprises a rubber core of polybutadiene homopolymer or a styrene-butadiene copolymer having about 10 to 50% by weight styrene and about 90 to 50% by weight of butadiene, with a molecular weight of from about 150,000 to about 500,000. Another class of preferred core-shell graft copolymers, comprises greater than 75% by weight acrylate monomers, with n-butyl acrylate most being preferred.

The rigid, thermoplastic shell of the copolymer comprises polymerized units of (1) a monoalkenyl arene alone or (2) a monoalkenyl arene copolymerized with one or more other vinyl monomers wherein at least 10 mole percent of the graft component is derived from the monoalkenyl arene monomers, or (3) polymerized acrylate ($C_1$–$C_{16}$) monomers alone or (4) copolymerized acrylate monomers ($C_1$–$C_{16}$) with other vinyl monomers. Preferred monoalkenyl arene monomers are styrene, alpha-methylstyrene, para-methyltyrene and the like, most preferably styrene. The vinyl monomers that may be copolymerized with the monoalkenyl arene monomers in an amount up to 90 mole % include (a) the esters of acrylic and methacrylic acid such as, for example, ethyl acrylate, methyl acrylate, butyl acrylate, methyl methacrylate, ethyl methacrylate, butyl methacrylate and the like; (b) unsaturated aliphatic nitrile such as acrylonitrile and methacrylonitrile and (c) vinyl halides such as vinyl chloride and vinyl bromide. The acrylate monomers suitable for use in providing the thermoplastic shell include the esters of acrylic and methacrylic acid given above. The preferred monomers are $C_1$–$C_4$ alkyl-methacrylates such as butylmethacrylate. The vinyl halides and unsaturated aliphatic nitriles are also suitable monomers for copolymerization with the acrylate monomers.

Preferred thermoplastic shells are those derived from polymerized units of styrene and methyl methacrylate wherein each is present in an amount ranging from 10 to 90 mole %. Another preferred class is that which comprises 50–100 weight % $C_1$–$C_4$ alkyl methacrylate. Additionally, these shells may also have copolymerized therewith a minor amount, preferably less than 10 mole % of one or more of the other aforementioned vinyl monomer units. As with the core, the shell phase may also include a cross-linking monomer or graft linking monomer as discussed more fully below.

Optionally, the core-shell graft copolymers may further comprise one or more cross-linked or non-cross-linked intermediate layers or phases between the core and shell which is grafted to the rubber core and upon which the final thermoplastic shell is grafted. These intermediates are comprised of one or more polymerized vinyl monomers. Suitable vinyl monomers for one of these intermediate layers include but are not limited to those mentioned above, especially styrene. Typically 75% to 100% styrene is used to form the intermediate stage or layer. Where such intermediate layers are present in the core-shell copolymer and are derived from at least 10 mole % of a monoalkenyl arene monomer, the final phase or shell may comprise up to and include 100 mole % monomer units which are not monoalkenyl arene units such as the acrylate monomers described above, and provide an acceptable impact modifier. Especially preferred in such instances are multi-phase copolymers wherein the intermediate phase comprises polystyrene and the final or outer thermoplastic shell comprises polymethyl methacrylate.

As mentioned above, each of the individual stages of the core-shell graft copolymers may contain a cross-linking monomer and/or a graft linking monomer. As the cross-linking agent for use in preparation of the croe-shell graft copolymers, those which copolymerize smoothly with the monomer in the respective stages of the reaction should be selected. These are generally polyethylenically unsaturated monomers having a plurality of double bonds all of which polymerize at substantially the same rate. Representative cross-linking agents include, but are not limited to aromatic polyfunctional vinyl compounds such as divinyl benzene, trivinyl benzene, divinyl toluene and the like and polyacrylic or polymethacrylic esters (di-and trimethacrylates or acrylates) of polyols represented by monoethylene-, diethylene- and triethylene glycols, 1,3- butanediol such as butylene diacrylate, trimethylol propane triacrylate, dimethyl acrylate, vinyl acrylate, and vinyl methacrylate.

A graft-linking monomer may also be incorporated into each stage at a weight percent of 0.1 to 5 based on the monomer charge. The graft linking monomer is also a polyethylenically unsaturated monomer having a plurality of double bonds. However, at least one of these double bonds polymerized at a different rate from the other unsaturated groups. These graft linking monomers provide a residual level of unsaturation in the latter stages of polymerization and, consequently, at or near the surface of the elastomeric particle. Glycerin allyl esters of unsaturated aliphatic carboxylic acids such a allyl acrylate, allyl methacrylate and the like are the preferred graft linking monomers. Diallyl and triallyl compounds such as diallyl phthalate, diallyl sebacate, triallyltriazine and the like are also suitable.

While the amount of cross-linking agent employed is from about 0.01 to 5.0% by weight based on the monomer charge for each stage of the reactions, generally, the total amount of cross-linking agent in the final graft copolymer will preferably be less than 3.0 weight percent.

The core-shell graft copolymers suitable for use herein generally comprise from about 25 to about 95 weight percent of the core and from about 5 up to 75 weight percent of the graft or shell phase. Where an intermediate phase or layer is present in the graft copolymer, the shell and intermediate phase will each comprise from about 5 to about 25 weight percent of the copolymer.

The core-shell graft copolymers for use in the present invention are prepared by the conventional method of emulsion polymerization, however in an alternative method, graft copolymerization may be carried out after suitably coagulating the latex of cross-linked trunk polymer so as to adjust the size of the latex particles of the trunk polymer.

Also, during polymerization, the monomeric components used in the graft copolymerization may be brought into reaction in one step, or in multiple steps while supplying them in proportions to obtain a ratio suitable for blends of the present invention.

Specific examples of suitable core-shell graft copolymers and the production thereof are disclosed, for example in U.S. Pat. No. 4,180,494, U.S. Pat. No. 4,022,748 and U.S. Pat. No. 4,292,233. Commercially available graft core-shell copolymers for use herein include the Acryloid®KM653, KM330, KM611, 8522XP and 8538XP from Rohm and Haas Chemical Company and Geloy® from General Electric Company Acryloid®KM330 has a poly(butyl acrylate) core and a poly(methyl methacrylate) shell. Acryloid®KM653 has a polybutadiene core and a poly(methyl methacrylate) shell. Acryloid ®8538XP and Acryloid®8522XP have polybutadiene cores and poly(methyl methacrylate) shells. These two (2) impact modifiers additionally contain heat stabilizers. Geloy®ASA has a poly(butyl acrylate) core and a cross-linked polystyrene poly(acrylonitrile) shell and intermediate layer.

The quantity of rubbery impact modifier (iv) can be present in all proportions. However, to obtain the most useful blends, it is preferably to maintain the concentration of impact modifier at less than 40 percent by weight, based on total resinous components (i) to (iv). Including concentrations of from 5 to 30 weight precent impact modifier provide a significant enhancement in impact strength without a significant loss to other desirable physical properties of the blend, such as heat distortion temperature. The most preferred concentrations fall within the range of about 5 to 25 weight percent.

The thermoplastic blends of the present invention are simply prepared by standard techniques; for example, by simple melt blending or dry mixind and melt extruding at an elevated temperature. The extruded admixture is then molded into a piece of specific dimensions or further extruded into a film or sheet product.

DESCRIPTION OF THE PREFERRED EMBODIMENTS

Further illustration of this invention is set forth in the following examples. There is no intention to limit the scope of the invention to merely what is shown.

EXAMPLE 1

(a)

Polybutylene Terephthalate—Polyamide Block Copolymer

A 4CV Helicone was charged with 487.1 g (1.53 moles) of diphenyl isophthalate and 174.3 g (1.50 moles) of hexamethylenediamine and blanketed with nitrogen. Agitation was started and the reaction mixture heated to 180° C.–185° C. After 45 minutes at 180° C.–185° C., 324.0 g (1.67 moles) of dimethyl terephthalate, 251.0 g (2.79 moles) of 1,4-butanediol and 1.0 ml of tetraoctyl titanate were added. After 15 minutes methanol began to distill. The reaction temperature was increased to 200° C.–205° C. after 75% of the theoretical amount of methanol distilled and 235° C. at 95% theoretical. A partial vacuum was applied to the system, 125 mm of Hg, and slowly decreased to full vacuum, less than 2 mm of Hg, over 1 hour. At full vacuum, the temperature was increased to 250° C.–255° C. and held there for 2 to 2.5 hours. After breaking vacuum the polymer was discharged from the reactor and allowed to cool to room temperature. The polymer extrudate was tough and opaque. Its intrinsic viscosity as measured in phenol/tetrachlorethane (60/40) was 0.77. A glass transition temperature of 118° C. and a melting point of 219° C. was measured by differential scanning calorimetry.

(b)

Compatibilized Blend of Polyamide and Polyester

An impact modified polyester/nylon blend was prepared by melt blending 500 g of poly(1,4-butylene terephthalate) VALOX ®315 resin, General Electric Company 500 g of poly(hexamethylene iso/terephthalamide) Nylon 6, I, T, Zytel ®330 E.I. duPont, 280 g of a rubbery core-shell impact modifier, ACRYLOID ®KM 653, Rohm & Haas Co., and 400 g of the polyamide-polyester block copolymer of step (a) in a Werner Pfleiderer ZSK 30 mm twin screw extruder at barrel temperatures ranging from 460° F. to 500° F. The polybutylene terephthalate Nylon 6, I, T and block copolymer components were dried for at least 6 hours at 110° C. in an air circulating oven prior to extrusion. The resulting pellets were redried under similar conditions before molding into standard ASTM parts on a 3 oz., 70 ton, Newbury injection molding machine at 500° F. Mechanical properties were measured according to standard ASTM procedures and the results are summarized in Table 1.

COMPARATIVE EXAMPLE A

Example 1, step (b) was repeated with the omission of the block copolymer synthesized in Example 1a. In addition, the concentration of rubber impact modifier KM 653 was reduced to 200 g in order to maintain a level of of 20 phr based on the total weight of the other components. Mechanical properties for this blend are summarized in Table 1.

EXAMPLE 2

Example 1(b) was repeated except that poly(ethylene terephthalate), Tenite ®7352, Eastman Kodak, was substituted for the poly(butylene terephthalate). Mechanical properties are summarized in Table 1.

COMPARATIVE EXAMPLE B

Comparative Example A was repeated except that poly(ethylene terephthalate) (Tenite ®7352, Eastman Kodak) was substituted for poly(butylene terephthalate). Mechanical properties for this blend are summarized in Table 1.

TABLE 1

Compatibilized Compositions Comprising Polyamide, Polyester and Polyamide-Polyester Block Copolymer

| Examples | A* | 1 | B* | 2 |
|---|---|---|---|---|
| Properties | | | | |
| Tensile Strength (Kpsi) | | | | |
| Yield | 9.1 | 8.9 | 8.6 | 8.4 |
| Break | 4.7 | 6.7 | 5.2 | 6.2 |
| Tensile Modulus (Kpsi) | 298.9 | 294.3 | 304.6 | 296.1 |
| Elongation (%) | | | | |
| Yield | 6.0 | 5.8 | 5.3 | 5.2 |
| Break | 100.0 | 75.5 | 59.8 | 61.8 |
| Notched Izod (ft-lb/in) | 1.4 | 3.7 | 2.2 | 11.8 |
| HDT (°F.) @ 264 psi | 163 | 158 | 185 | 192 |
| Delamination[a] | Yes | No | Yes | No |

*Comparitive
[a]Based on observations of tensile specimens after testing.

EXAMPLE 3

Example 1(b) was repeated with the substitution of poly(bisphenol-A carbonate), LEXAN®131 resin, General Electric Company, for the poly(1,4-butylene terephthalate). Mechanical properties are summarized in Table 2.

COMPARATIVE EXAMPLE C

The procedure of Comparative Example A was repeated with the substitution of poly(bisphenol-A carbonate), LEXAN®131 resin, General Electric Company, for the poly(1,4-butylene terephthalate). Mechanical properties are summarized in Table 2.

TABLE 2

Compatibilized Compositions Comprising Polyamide, Polycarbonate and Polyamide-Polyester Block Copolymer

| Example | C* | 3 |
|---|---|---|
| Properties | | |
| Tensile Strength (Kpsi) | | |
| Yield | 9.7 | 9.8 |
| Break | 7.0 | 7.5 |
| Tensile Modulus (Kpsi) | 304.1 | 309.4 |
| Elongation (%) | | |
| Yield | 6.1 | 5.8 |
| Break | 73.3 | 49.9 |
| Notched Izod (ft-lb/in) | 2.9 | 11.2 |
| HDT (°F.) @ 264 psi | 232 | 207 |
| Delamination[a] | Yes | Substantially None |

*Comparative
[a]based on observation of tensile specimens after testing.

In comparison with the comparative examples, the addition of the block copolymer according to this invention results in significantly higher notched Izod impact strength and no delamination during tensile testing.

The above mentioned patents, applications and publications are incoporated herein by reference.

Many variations will suggest themselves to those skilled this art in light of the foregoing detailed description. For example, instead of poly(1,4-butylene terephthalate), poly(1,4-cyclohexanedimethylene terephthalate) can be used. Instead of polyester or polycarbonate, a poly(ester carbonate) or a polyarylate can be used. All such obvious variations are within the full intended scope of the appended claims.

We claim:

1. A compatibilized thermoplastic resin composition comprising:
   (i) a high molecular weight thermoplastic resin selected from a thermoplastic polyester, an aromatic polycarbonate, a poly(ester carbonate) or a mixture of any of the foregoing.
   (ii) an amorphous polyamide resin; and
   (iii) an effective, compatibilizing amount of a polyamide-polyester block copolymer.

2. The composition of claim 1 which also includes
   (iv) an effective impact-improving amount of a rubbery impact modifier.

3. The composition of claim 1 which comprises from about 2 to about 98 percent by weight of said thermoplastic resin (i) and from about 98 to about 2 percent by weight of said polyamide (ii) per combined weight of (i) and (ii).

4. The composition of claim 3 which comprises from about 10 to about 90 percent by weight of thermoplastic (i) and from about 90 to about 10 percent by weight of polyamide (ii) per combined weight of (i) and (ii).

5. The composition of claim 1 wherein said thermoplastic resin (i) comprises a thermoplastic polyester.

6. The composition of claim 1 wherein said thermoplastic resin (i) comprises an aromatic polycarbonate.

7. The composition of claim 1 wherein said thermoplastic resin (i) comprises a poly(ester carbonate).

8. The composition of claim 1 wherein said thermoplastic resin (i) comprises a polyarylate.

9. A thermoplastic composition as defined in claim 1 wherein the polyamide contains structural units of the formulae:

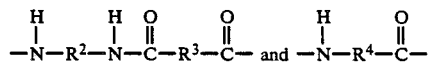

wherein $R^2$, $R^3$ and $R^4$ are the same or are different divalent organic radicals selected from the group consisting of $C_2-C_{15}$ alkylene radicals, $C_3-C_{18}$ cycloalkylene radicals and $C_6$ to $C_{20}$ arylene radicals.

10. A thermoplastic composition as in claim 9 wherein said polyamide is prepared by polymerization of (a) a diamine of the formula

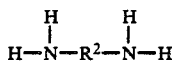

with a dicarbonyl compound of the formula

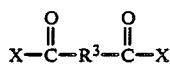

wherein X is Cl, OH, $C_1$–$C_6$ alkoxy or $C_6$–$C_{20}$ aryloxy; or (b) a monoamino-monocarbonyl compound of the formula

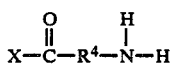

wherein X is Cl, OH, $C_1$–$C_6$ alkoxy or $C_6$ or $C_6$–$C_{20}$ aryloxy; or (c) a lactam structure of the monoaminomonocarbonyl compound of (b); or (d) a combination of (a), (b) and (c).

11. A thermoplastic composition as defined in claim 10 wherein the polyamide is obtained by polymerization of aminocaproic acid, butyrolactam, pivalolactam, caprolactam, capryllactam, enanthrolactam, undecanolactam, dodecanolactam, 3-aminobenzoic acid and 4-aminobenzoic acid or a mixture of any of the foregoing.

12. A thermoplastic composition as defined in claim 10 wherein the polyamide is obtained by polymerization of a diamine selected from ethylenediamine, trimethylenediamine, tetramethylenediamine, pentamethylenediamine, 2-methylpentamethylenediamine, hexamethylenediamine, isomeric trimethylhexamethylenediamine, metaxylylenediamine, para-xylenediamine, 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, 1,4-piperazine, meta-phenylenediamine, para-phenylenediamine, bis(4-aminophenyl)methane or mixtures thereof; with a dicarboxylic acid selected from sebacic acid, suberic acid, glutaric acid, pimelac acid, adipic acid, terephthalic acid, isophthalic acid, azelaic acid or a mixture of any of the foregoing.

13. A thermoplastic composition composition as defined in claim 12 wherein the polyamide is obtained by polymerization of (a) terephthalic acid with trimethylhexamethylenediamine; or (b) isophthalic acid with trimethylhexamethylenediamine; or (c) adipic acid and azelaic acid with 2,2-bis-(aminocyclohexyl)propane, or (d) terephthalic acid with bis(4-aminocyclohexyl)methane; or (e) isophthalic acid or adipic acid with hexamethylene diamine; or (f) terephthalic acid/isophthalic acid with hexamethylenediamine.

14. The composition of claim 1 wherein said polyamide (ii) comprises at least two nylons selected from the group consisting of nylon 6, 6/6, 11, 12, 6/3, 4/6, 6/4, 6/9, 6/10 and 6/12.

15. The composition of claim 5 wherein said polyester comprises units derived from a dihydric alcohol, a polyetherglycol, a cyclohexanedialkanol, or a mixture of any of the foregoing.

16. The composition of claim 5 wherein said polyester comprises units derived from ethylene glycol, 1,4-butanediol, polyethylene oxide diol, 1,4-cyclohexanedimethanol or a mixture of any of the foregoing.

17. The composition of claim 5 wherein said polyester comprises units from terephthalic acid, isophthalic acid, a mixture thereof or a chemical equivalent thereof.

18. The composition of claim 1 wherein said polycarbonate comprises poly(bisphenol-A carbonate).

19. The composition of claim 7 wherein said poly(ester carbonate) comprises units derived from bisphenol A, iso/terephthalic acid and a carbonate precursor.

20. The composition of claim 8 wherein said thermoplastic polyester comprises units derived from bisphenol A and iso/terephthalic acid.

21. The composition of claim 1 wherein said polyamide polyester block copolymer is of the general formula

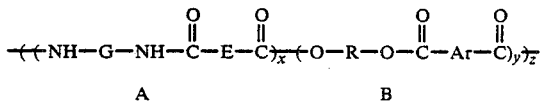

wherein repeating units A comprise an amorphous or crystalline polyamide constituting from about 1 to about 99 percent by weight of said block copolymer and repeating units B comprise a polyester constituting from about 99 to about 1 percent by weight of said block copolymer, where E is selected from divalent alkyl, aryl, cycloalkyl, arylalkyl and alkylaryl groups of from 1 to 30 carbon atoms or a mixture of any of the foregoing, optionally substituted with at least one chlorine, bromine, fluorine, nitro, nitrile alkyl of from 1 to 6 carbon atoms, alkoxy of from 1 to 6 carbon atoms or aryl of from 6 to 20 carbon atoms, G is a divalent alkyl, aryl, cycloalkyl, arylalkyl or alkylaryl group of from about 2 to about 30 carbon atoms or a mixture of any of the foregoing, optionally interrupted with akylene, arylene, carbonyl, ether, amino or sulfur-containing groups, optionally substituted with at least one of chlorine, bromine, fluorine, nitro, nitrile, alkyl of from 1 to 6 carbon atoms, alkoxy of from 1 to 6 carbon atoms or aryl of from 6 to 20 carbon atoms; R is a divalent alkyl cycloalkyl, or aliphatic ether group of from about 1 to about 10 carbon atoms or a mixture of such groups, and Ar is a divalent aromatic carbocyclic group, optionally substituted with at least one of chlorine, bromine, fluorine, nitro, nitrile, alkyl of from 1 to 6 carbon atoms, alkoxy of from 1 to 6 carbon atoms, aryl of from 6 to 20 carbon atoms or a mixture of any such groups, and x, y and z are each integers of from 1 to 100,000.

22. The composition of claim 1 wherein said block copolymer (iii) comprises from about 10 to about 50 parts by weight per 100 parts by weight of said polyester resin (i) and said polyamide resin (ii).